United States Patent [19]
Beattie et al.

[11] Patent Number: 5,947,421
[45] Date of Patent: Sep. 7, 1999

[54] ELECTROSTATIC PROPULSION SYSTEMS AND METHODS

[76] Inventors: John R. Beattie, 1106 Finrod Ct, Westlake Village, Calif. 91361; Philip J. Goswitz, 2334 Palos Verdes Dr. West, #2, Palos Verdes Estates, Calif. 90274

[21] Appl. No.: 08/890,477

[22] Filed: Jul. 9, 1997

[51] Int. Cl.⁶ .................................................. B64G 1/40
[52] U.S. Cl. ............................................ 244/172; 60/202
[58] Field of Search ............................. 244/172; 60/202; 313/359.1, 360.1

[56] References Cited

U.S. PATENT DOCUMENTS

| | | | |
|---|---|---|---|
| 4,838,021 | 6/1989 | Beattie | 60/202 |
| 5,269,131 | 12/1993 | Brophy | 60/202 |
| 5,339,623 | 8/1994 | Smith | 60/203.1 |
| 5,369,953 | 12/1994 | Brophy | 60/202 |
| 5,689,950 | 11/1997 | Smith | 60/202 |

OTHER PUBLICATIONS

Morgan, Walter L., et al., *Communications Satellite Handbook*, John Wiley and Sons, New York, 1989, pp. 651–653, 656, 657, 849, 850 and 867–869.

Sutton, George F., *Rocket Propulsion Elements*, John Wiley and Sons, New York, 1992, pp. 580–590.

*Primary Examiner*—J. Woodrow Eldred
*Attorney, Agent, or Firm*—Terje Gudmestad; Georgann Grunebach; Michael W. Sales

[57] ABSTRACT

Electrostatic propulsion systems for spacecraft include a plurality of electrostatic thrusters that are continuously coupled to power forms of a power supply system. Ionizable gas is fed to a selected one of the thrusters to selectively initiate the thrust of that electrostatic thruster. In other embodiments, heater power forms are coupled only to the selected thruster to reduce power consumption and increase cathode lifetime. The propulsion system has a reduced complexity and is especially suited for spacecraft in which only one thruster is ever fired at a given time.

5 Claims, 6 Drawing Sheets

ELECTROSTATIC PROPULSION SYSTEMS AND METHODS

BACKGROUND OF THE INVENTION

1. Field of the Invention

The present invention relates generally to spacecraft propulsion systems and, more particularly, to electrostatic propulsion systems.

2. Description of the Related Art

On-board propulsion systems are used to realize a variety of spacecraft maneuvers such as orbit raising (e.g., raising from a low Earth orbit to a geostationary orbit), stationkeeping (e.g., correcting the inclination, drift and eccentricity of a satellite's orbit) and attitude control (e.g., correcting attitude errors about a satellite's roll, pitch and yaw axes).

The force exerted on a spacecraft by a propulsion system's thruster is expressed in equation (1)

$$F = \dot{m} v_e = \frac{\dot{w}}{g} v_e = \dot{w} I_{sp} \quad (1)$$

as the product of the thruster's mass flow rate and the thruster's exhaust velocity. Equation (1) also shows that mass flow rate can be replaced by the ratio of weight flow rate to the acceleration of gravity and that the ratio of exhaust velocity to the acceleration of gravity can be represented by specific impulse $I_{sp}$ which is a thruster figure of merit. Equation (1) can be rewritten as equation (2)

$$I_{sp} = \frac{F}{\dot{w}} \quad (2)$$

to show that specific impulse is the ratio of thrust to weight flow rate.

When a thruster is used to effect a spacecraft maneuver, a velocity increase $\Delta V$ of the spacecraft is gained with a differential loss in mass of stored fuel, i.e., a differential between the spacecraft's initial mass $M_i$ (prior to the maneuver) and the spacecraft's final mass $M_f$ (after the maneuver). This mass differential is a function of the thruster's specific impulse $I_{sp}$ as expressed by the "rocket equation" of $$M_f = M_i e^{-\left(\frac{\Delta V}{g I_{sp}}\right)} \quad (3)$$

in which $\Delta V$ has units of meters/second, $I_{sp}$ has units of seconds and a constant g is the acceleration of gravity in meter/second$^2$. Equation (3) states that fuel loss causes a spacecraft's final mass $M_f$ to exponentially decrease with increased $\Delta V$ and that this decrease can be exponentially offset by an increase in specific impulse $I_{sp}$.

Specific impulse is therefore an important measure of a thruster's fuel efficiency. Basic thruster types and their specific impulses are described in various spacecraft sources (e.g., Morgan, Walter L., et al., *Communications Satellite Handbook*, John Wiley and Sons, New York, 1989, pp. 651–653, 656, 657, 849, 850 and 867–869). Typical specific impulses are 230 seconds for monopropellant thrusters, 290 seconds for solid propellant thrusters, 445 seconds for bipropellant thrusters and 500 seconds for electric arc jet thrusters.

In contrast to these thruster types, electrostatic thrusters achieve thrust through the interaction of electrostatic fields on charged propellant particles such as ions and charged colloids. Conventional electrostatic thrusters (as described, for example, in Sutton, George F., *Rocket Propulsion Elements*, John Wiley and Sons, New York, 1992, pp. 580–590) include electron bombardment thrusters, ion contact thrusters and field emission or colloid thrusters. In electron bombardment thrusters, ions are produced by bombarding a gaseous propellant (e.g., xenon) with electrons from a heated cathode. In ion contact thrusters, ions are produced by passing a propellant vapor through a hot, porous contact ionizer (made, for example, of tungsten). In field emission thrusters, propellant droplets are electrically charged by passing them through intense electric fields. Electrostatic thrusters are capable of very high specific impulses (e.g., ion thrusters have been developed with specific impulses in excess of 2500 seconds).

The high specific impulse of electrostatic thrusters makes them an attractive thruster for spacecraft maneuvers. Their high fuel efficiency can facilitate a reduction of initial satellite mass, an increased payload and a longer on-orbit lifetime. Reduction of initial mass lowers the spacecraft's initial launch cost and increased payload and longer lifetime increase the revenue that is generated by the spacecraft.

Spacecraft generally carry a plurality of thrusters to effect spacecraft maneuvers. Each of these thrusters has typically been provided with its own power supply system (e.g., a spacecraft with four thrusters also has four thruster power supply systems). Because weight and volume are at a premium in spacecraft, a simpler propulsion system is desirable.

SUMMARY OF THE INVENTION

The present invention is directed to a spacecraft electrostatic propulsion system which operates with a reduced number of power supply systems, e.g., reduced from the number of thrusters.

This goal is realized with the recognition that, in the absence of ionizable gas, electrostatic thrusters do not draw substantial power from their power forms (i.e., voltage and current combinations). In the case of an ion thruster, for example, electric current flows through most thruster structures only when an ionizable gas flow is initiated.

Thus, selectable thrusts can be applied to a spacecraft by coupling a plurality of electrostatic thrusters to the spacecraft, continuously applying power forms to the electrostatic thrusters and feeding ionizable gas to a selected one of the electrostatic thrusters to selectively initiate the thrust of that electrostatic thruster.

In another spacecraft embodiment, power forms other than heater power forms are continuously applied to the electrostatic thrusters and the heater power forms are applied only to cathodes of the selected thruster. This embodiment further reduces power usage and extends cathode lifetimes.

An embodiment of an electrostatic propulsion system of the invention has a plurality of electrostatic thrusters, a single power supply system coupled to the thrusters and a gas valve associated with each of the thrusters. The gas valves are each coupled to control the flow of ionizable gas to a respective one of the ion thrusters and each opens in response to a respective control signal. Thus, each of the electrostatic thrusters generates a thrust and draws substantial power from the power supply system only in response to the control signal of its respective gas valve.

In another electrostatic propulsion system embodiment, the selected thruster can be selectively coupled to a respective heater power supply. Thus, the cathode heaters of non-selected thrusters do not dissipate power, total power dissipation is further reduced and cathode lifetime is extended.

The teachings of the invention can be practiced with any electrostatic thruster, e.g., ion thrusters. The invention is particularly suited for spacecraft in which only one thruster is fired at any given time.

The novel features of the invention are set forth with particularity in the appended claims. The invention will be best understood from the following description when read in conjunction with the accompanying drawings.

DETAILED DESCRIPTION OF THE PREFERRED EMBODIMENTS

FIGS. 1–4 illustrate a spacecraft propulsion system in accordance with the present invention. The propulsion system realizes a significant reduction in complexity which translates into weight, volume and cost savings of spacecraft which use this system.

Figure 1:
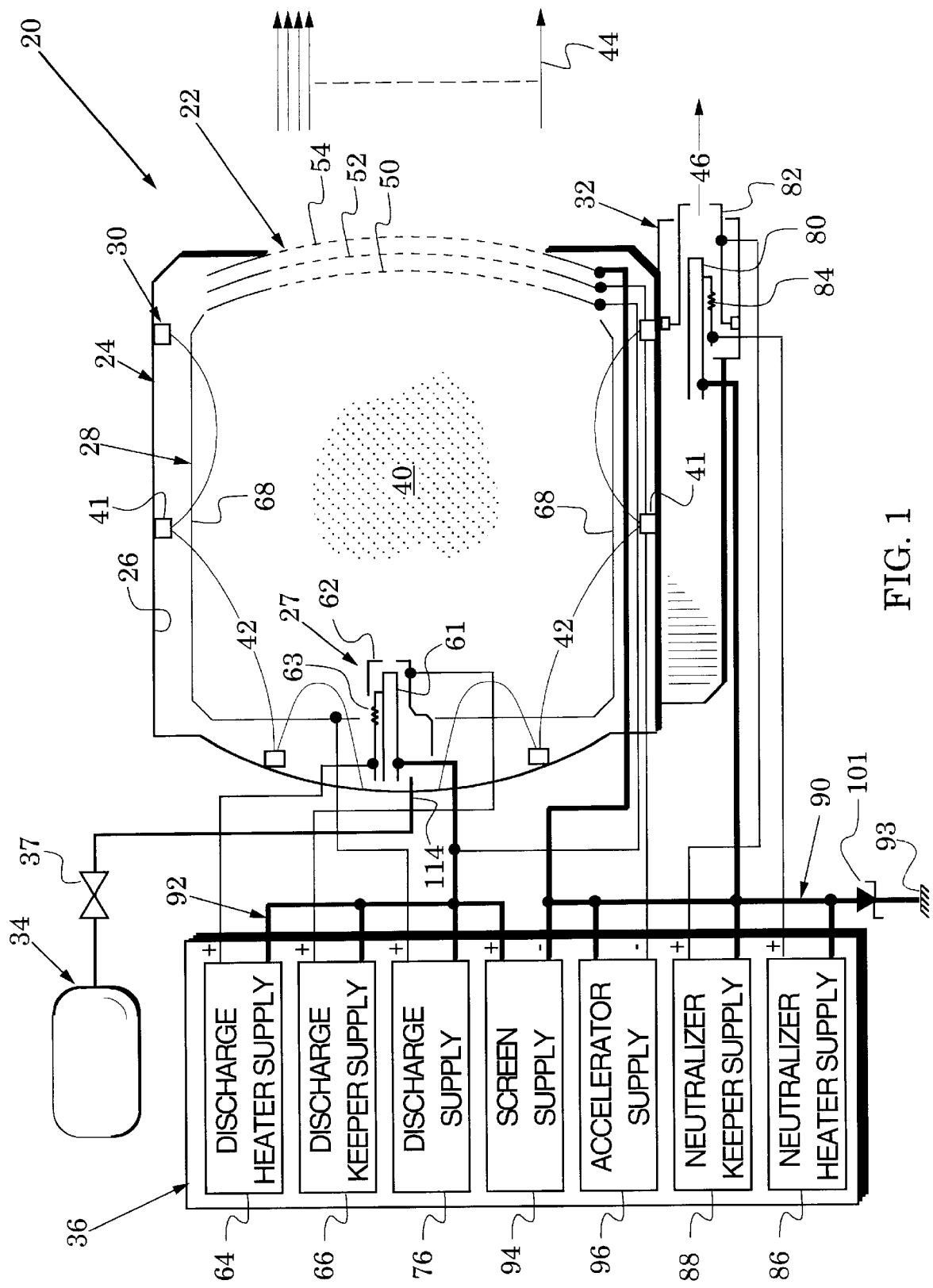
FIG. 1 is a side elevation view of an electrostatic thruster and its associated power supply system.

The ion thruster 20 of FIG. 1 includes an ion-optics system 22, a housing 24 which forms an ionization chamber 26, a discharge electron source 27 and an electrode system 28 which are positioned within the chamber 26, a magnetic field generator 30 which is also positioned within the chamber 26, a neutralizer 32 positioned adjacent the ion-optics system 22. The ion thruster 20 is coupled to a vessel 34 which contains an ionizable gas (e.g., xenon) and a power supply system 36.

In a basic operation of the ion thruster 20, the ionizable gas of the vessel 34 is supplied to the chamber 26 via a valve 37 and primary electrons are injected into the gas from the electron source 27. A discharge voltage applied to the electrode system 28 accelerates these electrons into collisions with gas atoms to generate a plasma 40. The magnetic field generator 30 typically includes annular permanent magnets 41 and is configured to develop magnetic flux lines 42 proximate to the housing 24. These flux lines direct electrons along extended paths and thus enhance the generation of the plasma 40. The ion-optics system 22 has a screen grid 50, an accelerator grid 52 and a decelerator grid 54. Power forms developed by the power supply system 36 are applied to the grids to cause the ion-optics system 22 to extract an ion beam 44 from the plasma 40 and accelerate it away from the thruster 20. The ion beam 44 generates a force upon the ion thruster 20 and structures (e.g., a spacecraft) which are attached to the thruster.

If not otherwise compensated, the positive charge flow of the ion beam 44 would develop a negative charge on the ion thruster that would degrade the thruster's force. Accordingly, the neutralizer 32 injects an electron stream 46 into the proximity of the ion beam to offset its charge-depleting effects. The electron stream 46 also partially neutralizes the positive space charge of the ion beam 44 to prevent excessive beam divergence.

The structure of the ion thruster 20 includes the following details. The discharge electron source 27 has a cathode 61, a keeper electrode 62 and a heater 63 which receives current from a discharge heater supply 64 of the power supply system 36. A discharge keeper supply 66 of the power supply system 36 places a positive voltage on the keeper electrode 62 to initiate a plasma discharge and provide electrons to the chamber 26. The electrode system 28 has the cathode 61 and an anode 68. A discharge voltage is placed across the electron source 27 and the anode 68 by a discharge supply 76 of the power supply system to accelerate the primary electrons through the ionizable gas.

The neutralizer 32 includes a neutralizer cathode 80, a keeper electrode 82 and a heater 84 which are substantially the same as the cathode 61, keeper electrode 62 and heater 63 that are positioned in the chamber 26. A neutralizer heater supply 86 of the power supply system is coupled across the heater 84 to generate an electron supply and a neutralizer keeper supply 88 of the power supply system places a positive voltage on the keeper electrode 82 to initiate a plasma which is the source of the electron stream 46.

The power supply system 26 has a lower supply bus 90 and an upper supply bus 92. The lower supply bus 90 is referenced to a spacecraft "ground" 93 and the potentials of the supply buses 90 and 92 are electrically spaced apart by the voltage differential of a screen supply 94. The lower supply bus 90 references the neutralizer keeper supply 88, the neutralizer heater supply 86, an accelerator supply 96 and the decelerator grid 54 to the neutralizer's cathode 80. A zener diode 101 in the lower supply bus 90 allows it to float negative with respect to the spacecraft potential to realize a potential which causes the electron stream 46 to equalize the ion beam 44. The upper supply bus 92 references the discharge supply 76, the discharge keeper supply 66, the discharge heater supply 64 and the screen grid 50 to the discharge electron source 27.

Figure 2:
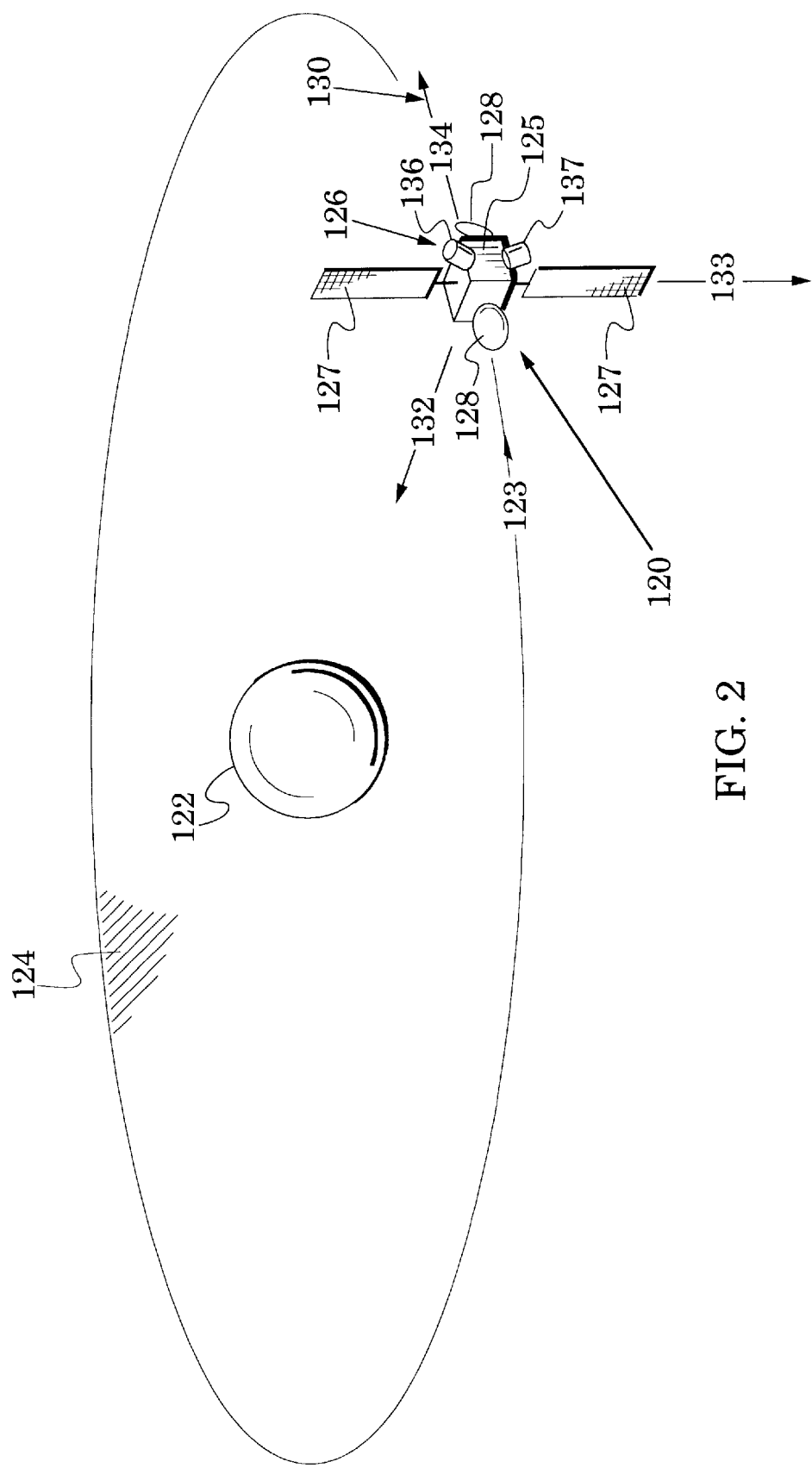
FIG. 2 is a perspective view of a spacecraft in an Earth orbit.
Figure 3:
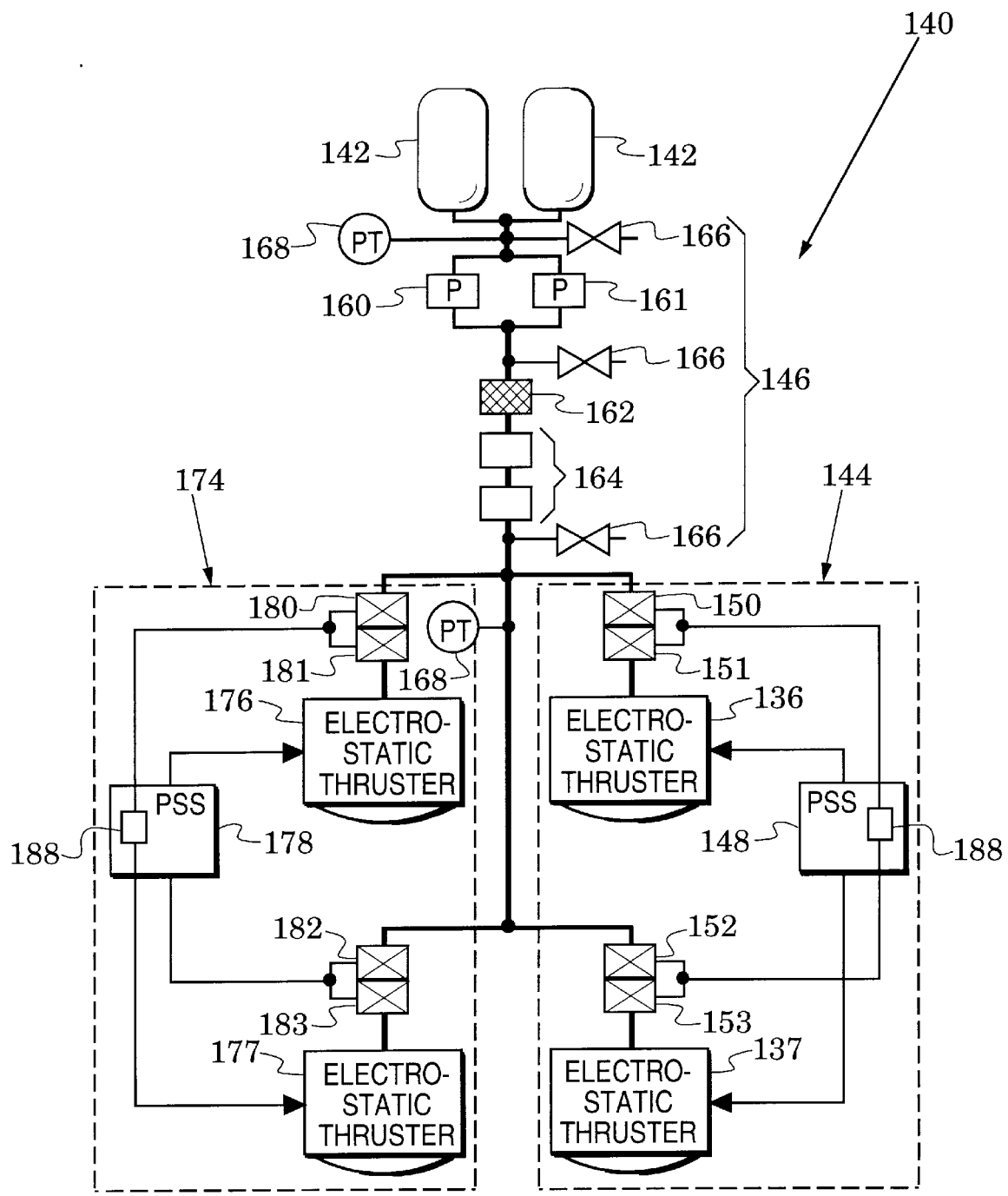
FIG. 3 is a block diagram of an electrostatic propulsion system of the spacecraft of FIG. 2.

FIG. 2 shows a spacecraft 120 orbiting the Earth 122 along an orbital path 123 which defines an orbital plane 124 and FIG. 3 shows the details of an electrostatic propulsion system 140 that is carried by the spacecraft.

The spacecraft 120 includes a body 125, a set of thrusters 126, solar cell arrays 127 which are directed towards the Sun for generating energy from solar radiation and a plurality of antennas 128 which are typically directed towards the Earth 22 for communication and tracking.

A spacecraft's attitude is typically defined with respect to a coordinate system that has an origin at the satellite's center of mass. The coordinate system 130 of FIG. 1 has a yaw axis 132 which is directed from the coordinate system's origin towards the Earth's center of mass. A pitch axis 133 is directed from the origin and is normal to the satellite's orbital plane 124. A roll axis 134 is normal to the other two coordinate axes and is aligned with the satellite's velocity vector. The faces of the spacecraft body 125 which are orthogonal to the yaw axis 132 are typically referred to as a nadir (facing the Earth 122) and an antinadir face. Similarly, the faces orthogonal to the pitch axis 133 are referred to as a south and a north face and the faces orthogonal to the roll axis 134 are referred to as an east and a west face.

A spacecraft's location is typically defined by the eccentricity of its orbital path 123, the inclination of its orbital plane 124 from the Earth's equatorial plane and the spacecraft's longitude on the orbital path. In a geostationary orbit, for example, the path eccentricity is substantially zero, the spacecraft's orbital plane is substantially coplanar with the Earth's equatorial plane and the spacecraft's longitude is substantially fixed (i.e., its orbital period matches the Earth's rotational period).

A variety of forces (the gravity of the sun and the moon, the Earth's triaxial shape and solar radiation pressure) act upon the spacecraft 120 and tend to disturb its position. The processes of maintaining the spacecraft's position with respect to the Earth is referred to as stationkeeping and the process of maintaining the spacecraft's attitude with respect to its coordinate system 130 is referred to as attitude control.

Stationkeeping is generally facilitated with thrusters which are preferably arranged to generate radial force components (components aligned with the yaw axis 132) and tangential force components (components aligned with the roll axis 134) to control eccentricity and longitude and normal force components (components aligned with the pitch axis 133) to control orbital inclination.

Attitude control is generally facilitated with momentum and/or reaction wheels whose momentum is periodically "dumped". In contrast with stationkeeping forces which are usually directed through the spacecraft's center of mass, attitude control dumping is preferably accomplished by directing the spacecraft's thrusters away from the center of mass so that they generate turning moments in the spacecraft.

The exemplary thruster set 126 of FIG. 1 includes a pair of thrusters 136 and 137. The thrusters 136 and 137 are oriented to generate oppositely-directed normal thrust components. The thrusters are preferably mounted so that they can be canted away from the pitch axis 133 to generate radial thrust components and slewed about the pitch axis 133 to generate tangential thrust components. Preferably, the thrusters are also mounted so that their thrust lines can be spaced from the spacecraft's center of mass to generate turning moments that facilitate dumping of momentum or reaction wheels in the spacecraft 120.

Thrusters 136 and 137 form one embodiment of a thruster set. Other thruster set embodiments can be formed with various numbers of thrusters (e.g., four or six) which are positioned in various spacecraft locations (e.g., nadir and antinadir faces, east and west faces and north and south faces) to generate at least one of radial, tangential and normal thrust components.

The thrusters 136 and 137 are part of an electrostatic propulsion system 140 which is detailed in FIG. 3. This system includes vessels 142 for containing an ionizable gas (e.g., Xenon). The vessels and a primary thruster system 144 are coupled together by a conduit system 146.

In the primary thruster system 144, the electrostatic thrusters 136 and 137 are coupled directly to a power supply system (PSS) 148 so that they are continuously energized by the power forms of the power supply system. In contrast, they are coupled to the conduit system 146 by latch valves which are responsive to control signals of the power supply system 148. In particular, the thruster 136 is coupled to the conduit system 146 by latch valves 150 and 151 and the thruster 137 is coupled to the conduit system 146 by latch valves 152 and 153.

In an electrostatic propulsion system embodiment of the invention, the electrostatic thrusters 136 and 137 are each one of the ion thrusters 20 of FIG. 1 and the power supply system 148 is the power supply system 36 of FIG. 1.

In operation of this propulsion system, power forms of the power supply system 148 are continuously applied to the thrusters 136 and 137. As long as the latch valves 150–153 remain closed, however, the thrusters will not dissipate a substantial amount of power (power dissipation is described in more detail hereinafter relative to FIGS. 5, 6, 7A and 7B) because they have no ionizable gas to process.

In response to a control signal from the power supply system 148, the latch valves 150 and 151 open to feed ionizable gas to the ion thruster 136. Because this ion thruster is continuously energized with power forms from the power supply system 148 and is now fed ionizable gas via latch valves 150 and 151, it generates an ion beam (44 in FIG. 1) and thrust is applied to the spacecraft (120 in FIG. 2). In this operational mode, thruster 137 generates no thrust and does not draw substantial power from the power supply system 148.

In response to a different control signal from the power supply system 148, the latch valves 152 and 153 open to feed ionizable gas to the ion thruster 137. Because this ion thruster is also continuously energized with power forms from the power supply system 148 and is now fed ionizable gas via latch valves 152 and 153, it generates an ion beam (44 in FIG. 1) and thrust is applied to the spacecraft (120 in FIG. 2). In this latter operational mode, latch valves 150 and 151 are closed so thruster 136 generates no thrust and does not draw substantial power from the power supply system 148.

Thus, selectively opening either latch valves 150 and 151 or latch valves 152 and 153 selectively initiates thrust from the ion thrusters 136 and 137.

In detail, the conduit system 146 includes a pair of pyrovalves 160 and 161, a gas filter 162, and a set 164 of pressure regulators. The pyrovalves are safety valves that prevent any inadvertent operation of the thrusters during the launch of the spacecraft (120 in FIG. 2). Once the spacecraft has been safely placed into orbit, the pyrovalves are blown open by application of control signals. The electrostatic propulsion system 140 is then ready for operation. The set 164 of pressure regulators reduces the gas pressure of the vessels 142 (e.g., ~77 kilograms/square centimeter) to a gas pressure (e.g., ~0.7 kilogram/square centimeter) that is suitable for the thrusters 136 and 137. In addition, the conduit system 146 has fill and drain valves 166 for maintenance of the propulsion system and pressure transducers 168 which facilitate monitoring of the propulsion system.

Because of the critical nature of their operation, important spacecraft systems typically have redundant or secondary elements which are available in case of failure of a primary element. Accordingly, the electrostatic propulsion system 140 has a secondary thruster system 174 which is coupled to the gas vessels 142 by the conduit system 146. The secondary thruster system 174 is similar to the primary thruster system 144. In particular, it has electrostatic thrusters 176 and 177 that are coupled directly to a power supply system 178 so that they are continuously energized by the power forms of that power supply system. The thruster 176 is coupled to the conduit system 146 by latch valves 180 and 181 and the thruster 177 is coupled to the conduit system 146 by latch valves 182 and 183.

In the spacecraft 120 of FIG. 2, each of the redundant thrusters of the secondary thruster system 174 would be typically mounted proximate to its respective thruster of the primary thruster system 144 so that it can perform the functions of that primary thruster in case of a thruster failure.

The need for redundancy is also the motivation for the serially-coupled sets of latch valves (e.g., the latch valves 150 and 151) in the primary and secondary thruster systems 144 and 174. If one of a set of latch valves sticks in its open position, the other latch valve can perform the functions of feeding and blocking ionizable gas to the associated thruster. This redundancy, however, fails if one of the set of latch valves sticks in its closed position. Exemplary control signals for latching the latch valves into their open and closed positions are ±5 volts. These control signals can be generated with conventional switch drivers 188 which can be integrated into the power supply systems 148 and 178.

Figure 4:
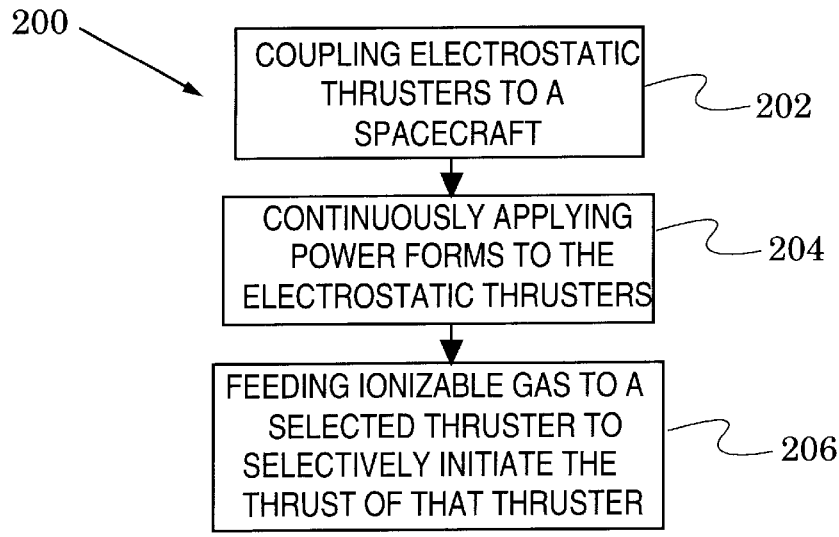
FIG. 4 is a flow chart which illustrates an exemplary operation of the electrostatic propulsion system of FIG. 3.

The basic operation of the electrostatic propulsion system 140 is summarized in the flow chart 200 of FIG. 4. In a first process step 202, electrostatic thrusters are coupled to a spacecraft. In a second process step 204, power forms are continuously applied to the electrostatic thrusters to energize them. Finally, in a third process step 206, ionizable gas is fed to a selected one of the electrostatic thrusters to selectively initiate the thrust of that electrostatic thruster.

In the electrostatic thruster 20 of FIG. 1, the discharge cathode 61 and the neutralizer cathode 80 typically carry a coating (e.g., barium calcium aluminate) which is converted by thermal heating into an oxide (e.g., barium oxide) that coats a dispenser (e.g., tungsten) whose low work function facilitates electron emission. This electron emission, in turn, facilitates the generation of localized plasma discharges upon application of power forms from the discharge keeper supply 66 and neutralizer keeper supply 88.

In describing the operation of the electrostatic propulsion system 140 of FIG. 3, it was stated above that power forms can be applied to the electrostatic thrusters and they will not dissipate substantial power as long as their respective gas latch valves (e.g., 150–153 in FIG. 3) remain closed. Although the dissipation in most elements of the ion thruster 20 of FIG. 1 is substantially zero in the absence of ionizable gas, cathode heaters (e.g., the cathode heaters 63 and 84 of FIG. 1) can dissipate significant amounts of power (e.g., ~30 watts) whenever they are energized (i.e., regardless of the status of the gas latch valves).

It is especially important to limit power consumption in spacecraft, both to reduce the amount of power that must be generated and the amount of heat that must be dissipated. Also, heaters and cathodes have limited lifetimes so that energizing heaters in unused electrostatic thrusters unnecessarily reduces system lifetime.

In addition, failure of a heater in the electrostatic propulsion system 140 of FIG. 3 may cause the loss of all thrusters coupled to the heater power supply of that heater. If the heater fails in a shorted condition, other heaters will typically be current starved. If the heater fails in an open condition, other heaters will typically carry excessive current and be subjected to dangerous temperature levels. For all of these reasons, heaters of nonselected thrusters are preferably not energized.

Figure 5:
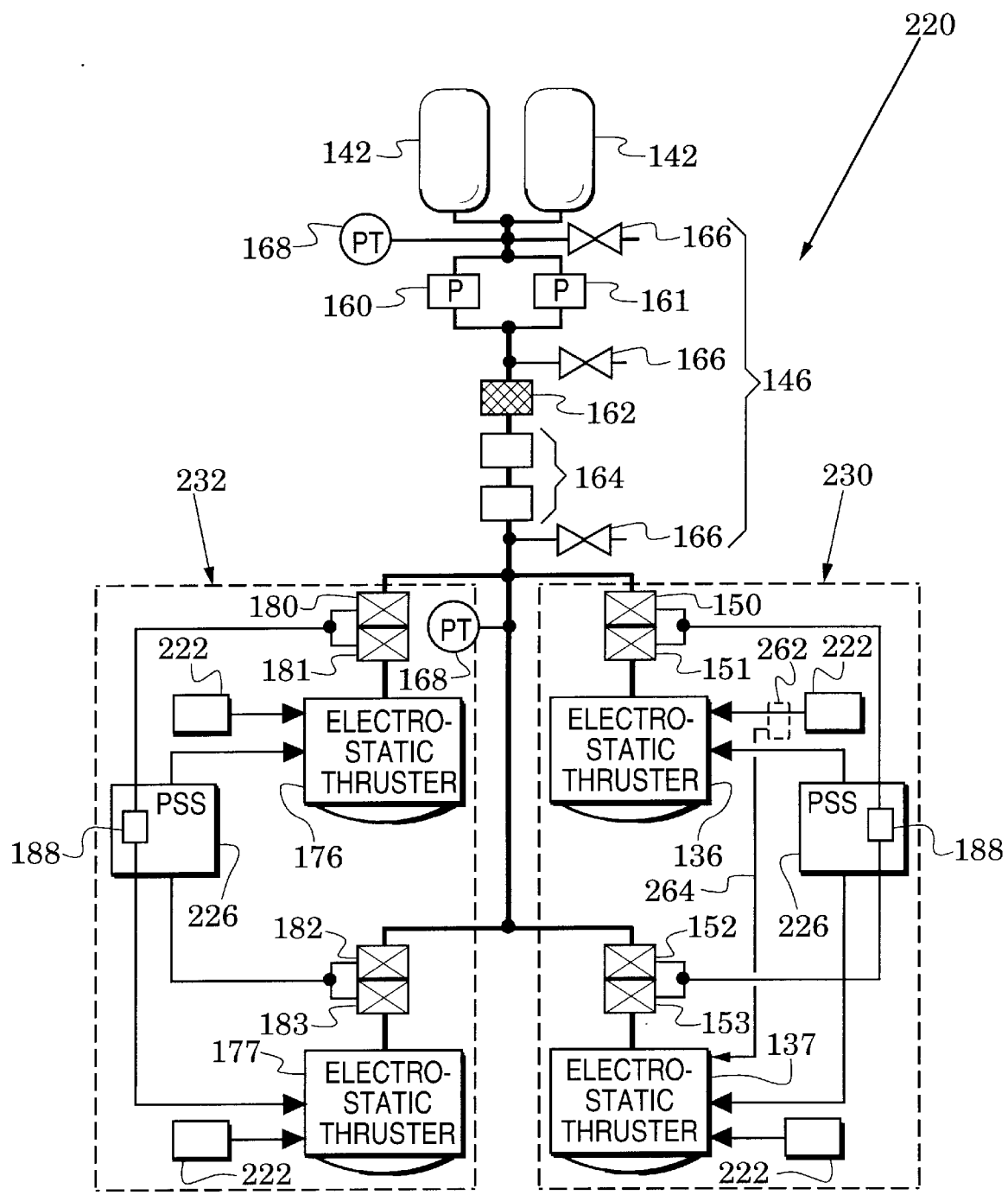
FIG. 5 is a block diagram of another electrostatic propulsion system.

Accordingly, FIG. 5 illustrates another electrostatic propulsion system 220 in which each electrostatic thruster is coupled to its own heater power supply 222. This supply includes power forms for all heaters in its respective electrostatic thruster (e.g., the discharge heater supply 64 and the neutralizer heater supply 86 of FIG. 1). A common PSS 226 which includes the other thruster power forms (e.g., the discharge keeper supply, 66, the discharge supply 76, the screen supply 94, the accelerator supply 96, and the neutralizer keeper supply 88 of FIG. 1) is coupled to each set of thrusters. Except for these differences, FIG. 5 is similar to FIG. 3 with like elements indicated by like reference numbers.

In particular, the electrostatic propulsion system 220 has a primary thruster system 230 and a secondary thruster system 232. In the primary system 230, thrusters 136 and 137 are coupled to a common PSS 226. In contrast, each thruster 136 and 137 is coupled to a respective heater power supply 222. Similarly, thrusters 176 and 177 of the secondary thruster system 232 are coupled to a common PSS 226 and each is also coupled to a respective heater power supply 222.

Figure 6:
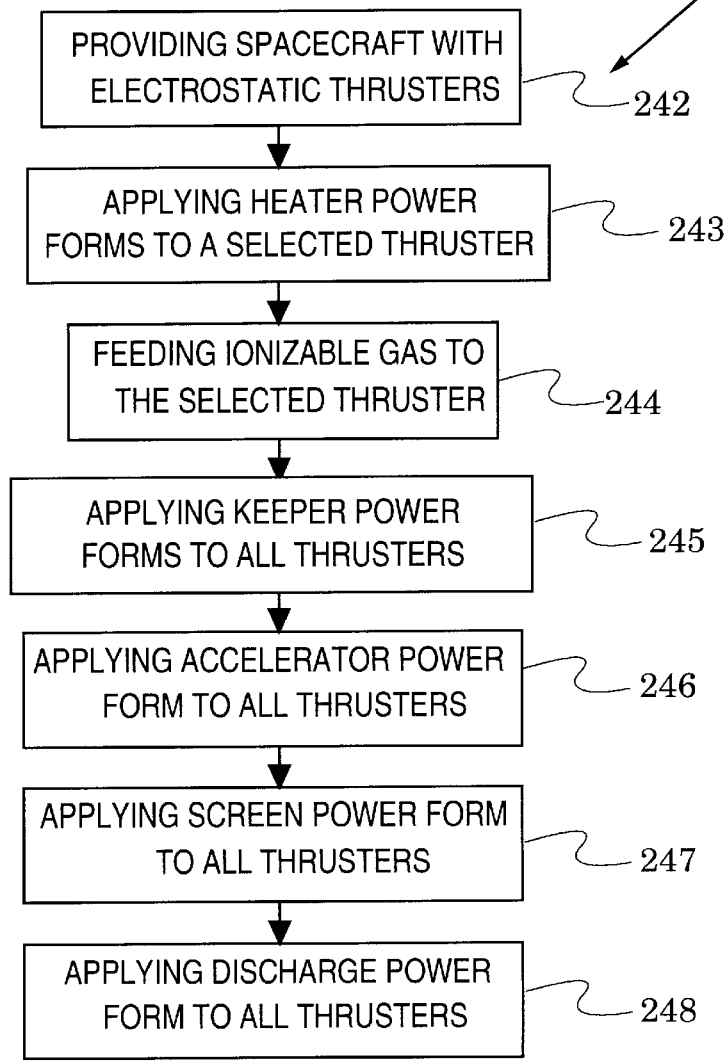
FIG. 6 is a flow chart which illustrates an exemplary operation of the electrostatic propulsion system of FIG. 5.
Figure 7B:
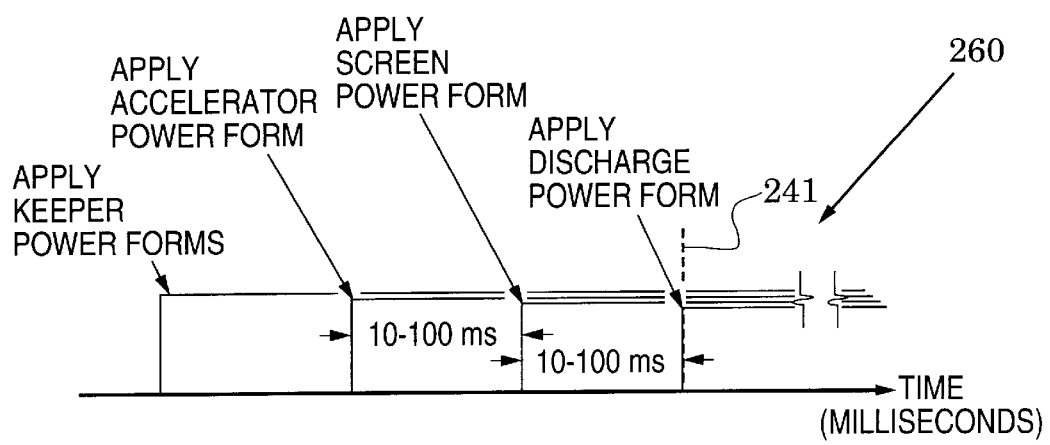
FIGS. 7A and 7B are timing diagrams which illustrate timing in the process steps of the flow chart of FIG. 6.
Figure 7A:
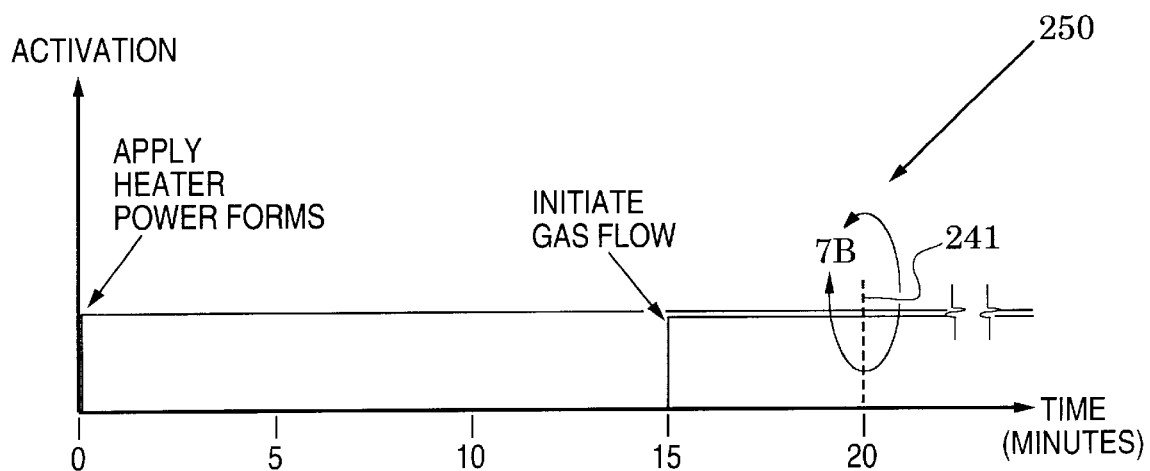

Operation of the electrostatic propulsion system 220 is described in the flow chart 240 of FIG. 6 and illustrated with the aid of timing diagrams 250 and 260 of FIGS. 7A and 7B. Preferably, the heater power forms are applied early in the operation of the system 220 of FIG. 5 so that electron emission is well established prior to thrust-initiation time which is represented in the timing diagrams 250 and 260 by a broken line 241.

After a process step 242 of providing a spacecraft with electrostatic thrusters, the flow chart 240 continues with a process step 243 of applying heater power forms to a selected thruster. The selected thruster being one (e.g., thruster 136 in FIG. 2) that has been selected for thrust generation.

As shown in FIG. 7A, heater power is applied prior to thrust initiation time 241 by a time period sufficient to fully establish electron emission (e.g., ~20 minutes). Next, ionizable gas is fed to the selected thruster as indicated by step 244 in FIG. 6. Gas is applied prior to thrust initiation time 241 by a time period (e.g., ~5 minutes) sufficient to fully fill the conduit system (146 in FIG. 5).

With a hot discharge cathode (61 in FIG. 1) and a supply of ionizable gas, thrust initiation can proceed to the final process steps that are shown in the detailed timing diagram 260 of FIG. 7B. First, the discharge keeper and neutralizer keeper power forms are applied to all thrusters as indicated in process step 245 of FIG. 6. Only in the selected thruster does this step establish a flow of electrons from the electron source (27 in FIG. 1) and the neutralizer (32 in FIG. 1).

Finally, a sequence of accelerator power form, screen power form and discharge power form is applied to the ion-optics system (22 in FIG. 1) of all thrusters as shown in process steps 246, 247 and 248 of FIG. 6. Only in the selected thruster does this last application of power forms generate a plasma, extract an ion beam (44 in FIG. 1) from the plasma and accelerate the beam away from the thruster (i.e., thrust is initiated only in the selected thruster).

As shown in the detailed timing diagram 260 of FIG. 7B, the applications of accelerator power form, screen power form and discharge power are typically spaced from each other by times on the order of 10–100 milliseconds. If application of the screen power form preceded application of the accelerator power form, electrons from the neutralizer's electron stream (46 in FIG. 1) would be drawn into the thruster through the ion-optics system (22 in FIG. 1). Preliminary application of the accelerator power form establishes an electrostatic barrier against these electrons.

In the operational sequence illustrated in FIG. 6, all power forms except the heater power forms are also applied to nonselected electrostatic thrusters. However, in the absence of ionizable gas, these thrusters draw substantially zero power from their power forms. Because heater power forms are not applied to nonselected thrusters, power required from the spacecraft is reduced and the lifetime of these heaters is extended.

In a different embodiment, the electrostatic propulsion system 220 of FIG. 5 is structured so that each thruster system (e.g., the primary thruster system 230) includes only a single heater power supply 222. In this embodiment, for example, the heater power supply associated with the electrostatic thruster 136 can be connected to a switch 262 (shown in broken lines). One switch output is connected to the thruster 136 and another switch output 264 is connected to the thruster 137. In response to a switch control signal, heater power forms can be coupled to a selected thruster. Similarly, ionizable gas is coupled to the selected thruster in response to a valve control signal applied to the latch valves (e.g., valves 150 and 151) of the selected thruster. In this embodiment, the other heater power supplies (e.g., the supply 222 in association with thruster 137) can be eliminated.

Electrostatic propulsion systems of the invention facilitate a reduction of spacecraft propulsion complexity. In particular, they enable single power supply systems to energize a plurality of electrostatic thrusters which are each selectively fired by selection of a gas valve associated with that thruster. These systems are especially suited for electrostatic thrusters and for spacecraft in which only one thruster is ever fired at a given time.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method for limiting power consumption while applying selectable thrusts to a spacecraft, comprising the steps of:

coupling a plurality of electrostatic thrusters to said spacecraft;

configuring a magnetic field in each of said electrostatic thrusters to direct electrons along extended paths within said electrostatic thrusters; and performing the following sequential steps:

a) first, applying a heater power form to a heater of only a selected thruster of said electrostatic thrusters to generate an electron supply in said selected thruster;

b) second, feeding said ionizable gas only to said selected thruster;

c) third, applying a keeper power form to keeper electrodes of all of said thrusters to thereby establish a flow of electrons from said electron supply in said selected thruster;

d) fourth, applying an accelerator power form to accelerator grids of all of said thrusters to thereby establish an electrostatic barrier in said selected thruster against outside electrons.

e) fifth, applying a screen power form to screen grids of all of said thrusters to thereby extract an ion beam from a plasma in said selected thruster and accelerate said ion beam away from said selected thruster; and f) sixth, applying a discharge power form to an electrode system of all of said thrusters to thereby accelerate said electrons along said extended paths and generate said plasma in said selected thruster;

power consumption limited by said heater power form applying step and thrust applied only in said selected thruster by said feeding step.

2. The method of claim 1, wherein each of said electrostatic thrusters is an ion thruster.

3. The method of claim 1, wherein said heater power form applying step precedes said feeding step by substantially 20 minutes to fully establish said electron supply.

4. The method of claim 1, wherein said feeding step precedes said keeper power form applying step by substantially 5 minutes to insure said ionizable gas fills said selected thruster.

5. The method of claim 1, wherein said accelerator power form applying step, said screen power form applying step and said discharge power form applying step are spaced apart by times on the order of 10–100 milliseconds.

* * * * *